United States Patent [19]
Ikari

[11] Patent Number: 6,052,240
[45] Date of Patent: Apr. 18, 2000

[54] IMAGE BLUR CORRECTION APPARATUS

[75] Inventor: Hideo Ikari, Kawasaki, Japan

[73] Assignee: Canon Kabushiki Kaisha, Tokyo, Japan

[21] Appl. No.: 09/154,861

[22] Filed: Sep. 16, 1998

[30] Foreign Application Priority Data

Sep. 19, 1997 [JP] Japan .................................. 9-271878

[51] Int. Cl.⁷ .............................. G02B 7/02; G02B 27/64
[52] U.S. Cl. .......................... 359/819; 359/813; 359/554
[58] Field of Search .................................. 359/819, 823, 359/821, 822, 829, 830, 813, 554, 824

[56] References Cited

U.S. PATENT DOCUMENTS

| | | | |
|---|---|---|---|
| 5,144,353 | 9/1992 | Odaka et al. | 354/400 |
| 5,526,192 | 6/1996 | Imura et al. | 359/813 |
| 5,835,799 | 11/1998 | Washisu | 396/55 |

FOREIGN PATENT DOCUMENTS

2-157732   6/1990   Japan .

*Primary Examiner*—Georgia Epps
*Assistant Examiner*—Suzanne Letendre
*Attorney, Agent, or Firm*—Fitzpatrick, Cella Harper & Scinto

[57] ABSTRACT

An image blur correction apparatus includes a movable member such as an image blur correction optical system or the like, which moves for image blur correction, an elastic member such as a spring or the like, which movably supports the movable member with respect to a predetermined base member, and has one end connected to the movable member and the other end connected to the base member, and a sliding suppression portion for suppressing sliding of the elastic member relative to the movable member at a contact surface therebetween or sliding of the elastic member relative to the base member at a contact surface therebetween. With this arrangement, the stop position control precision of the movable member, the phase delay characteristics and small vibration response characteristics upon operation of the movable member, and the like are improved.

16 Claims, 7 Drawing Sheets

IMAGE BLUR CORRECTION APPARATUS

BACKGROUND OF THE INVENTION

1. Field of the Invention

The present invention relates to an image blur correction apparatus for correcting an image blur produced by hand vibration or the like in an optical equipment such as a camera or the like.

2. Related Background Art

Conventionally, various apparatuses for correcting an image blur of a camera by using a lens which is displaced in a direction perpendicular to the photographing optical axis have been proposed, and are actually put into the market in recent years.

Japanese Patent Application Laid-Open No. 2-15773 proposed by the present applicant discloses an arrangement in which a correction lens which can be displaced in a direction perpendicular to the optical axis is supported by springs, and can be driven by an actuator. This arrangement has a position detection sensor for the correction lens, and feedback control is done to always locate the correction lens at a target position (blur suppression position) upon driving.

A recent apparatus of this type will be explained below with reference to the drawings.

Figure 8:
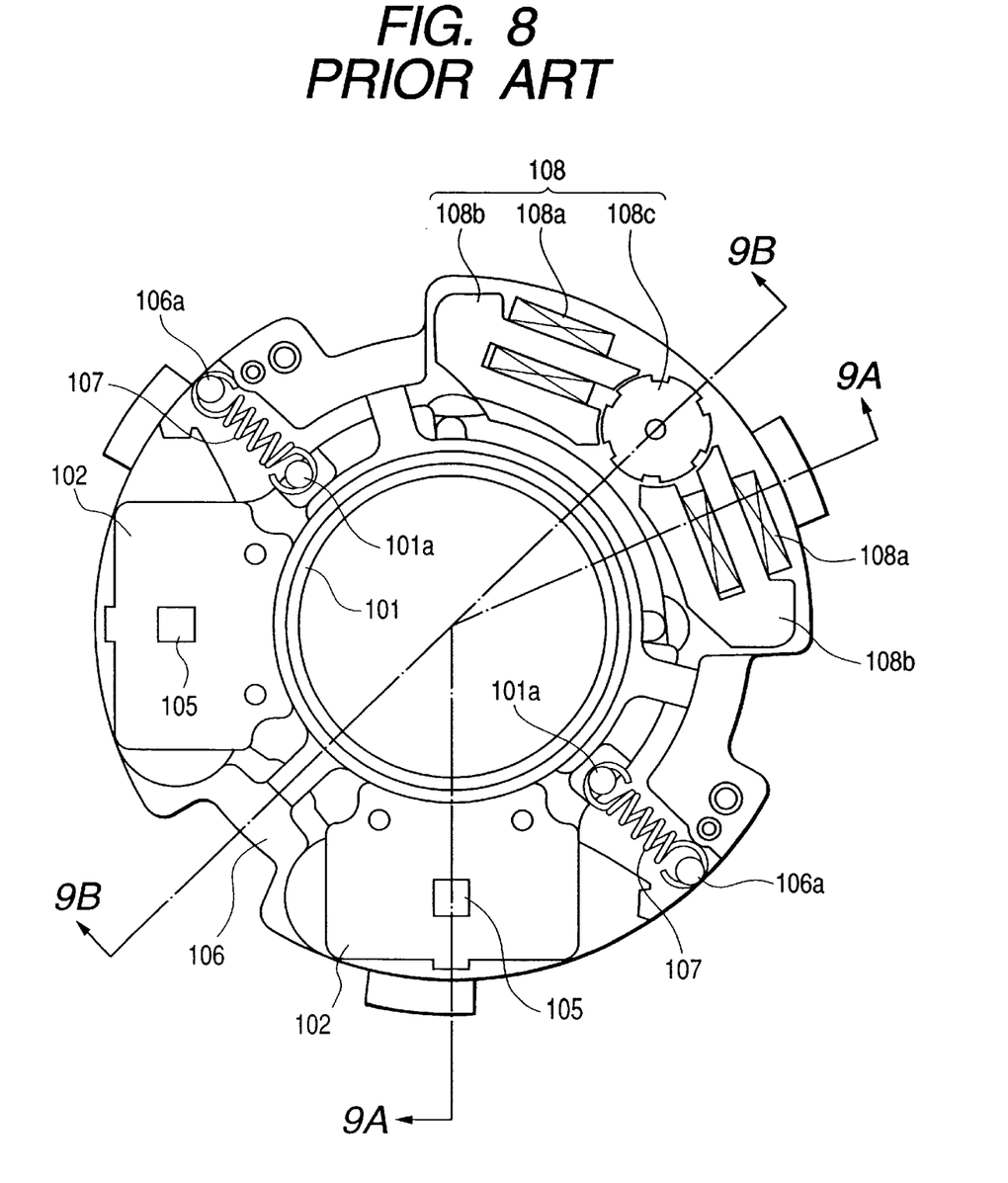
FIG. 8 is a plane view of a conventional blur correction apparatus.
Figure 9A:
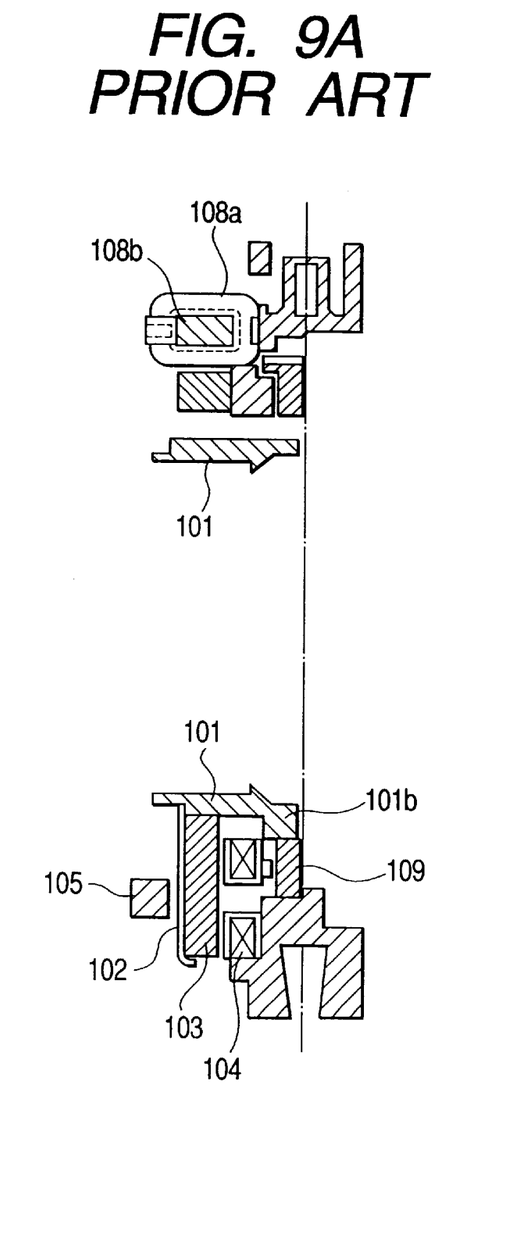
FIGS. 9A and 9B are sectional views respectively taken along lines 9A—9A and 9B—9B in FIG. 8.
Figure 9B:
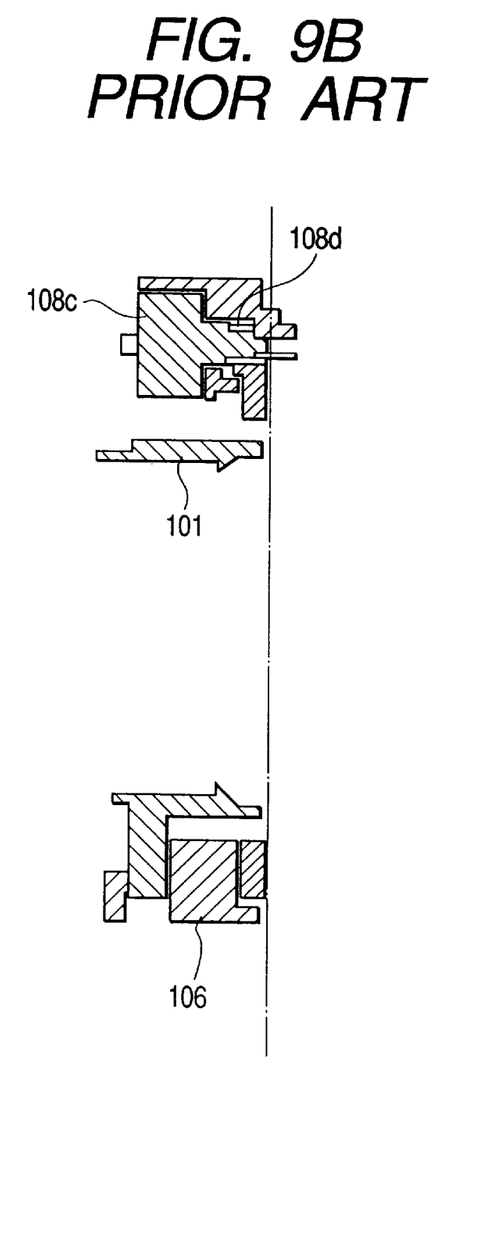
Figure 10:
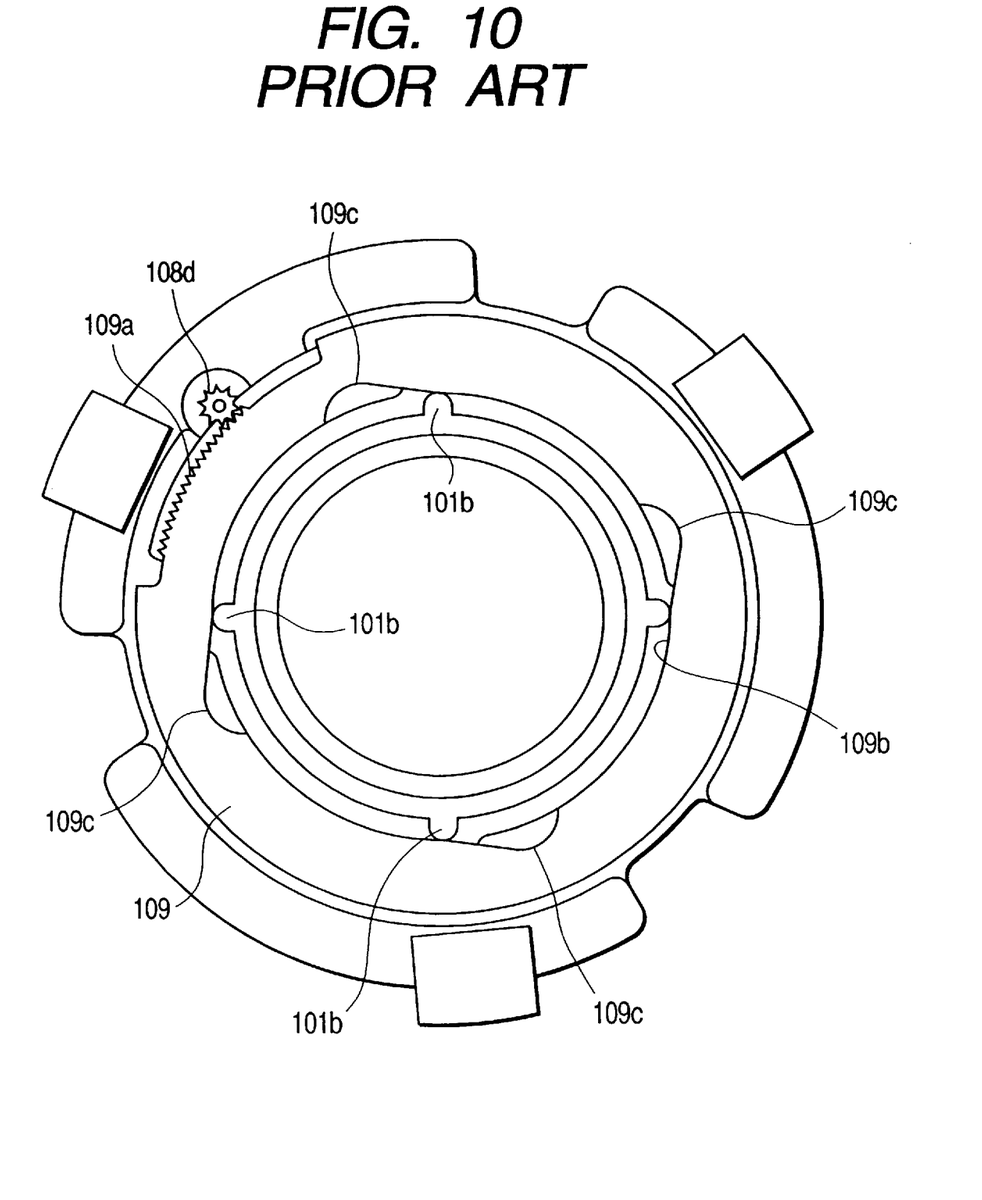
FIG. 10 is a back view of FIG. 8.

FIGS. 8 to 10 show a principal part (correction lens drive mechanism) of a conventional blur correction optical system. FIG. 8 is a plane view, FIG. 9A is a sectional view taken along a line 9A—9A in FIG. 8, FIG. 9B is a sectional view taken along a line 9B—9B in FIG. 8, and FIG. 10 is a back view of FIG. 8.

In these drawings, a lens holder 101 holds a blur correction lens. Yokes 102 are fixed to the lens holder, and fix magnets 103 thereto. Coils 104 are used for displacing the lens holder 101 by the so-called moving magnet method that generates a drive force in the magnets 103 upon energizing the coils 104. Hall elements 105 detect the position of the lens holder 101 by detecting magnetic fluxes coming from the magnets 103 that are displaced together with the lens holder 101. A base plate 106 serves as a base member for a parts layout. Each of two tensile coil springs 107 has two end portions which are respectively hooked on a spring lock 106a of the base plate 106 and a spring lock 101a of the lens holder 101. These tensile coil springs 107 are hooked at two opposing positions, and are designed to have identical spring characteristics such as spring constants, lengths, and the like, so that the lens center is located nearly the center of the photographing optical axis at the position where the two springs balance each other in a free state (i.e., a state wherein no electromagnetic forces (to be described later) act). A stepping motor 108 is constructed by coils 108a, yokes 108b, and a magnet 108c, and is known to those who are skilled in the art. The stepping motor 108 has a gear portion 108d (see FIG. 10). A lock ring 109 has a gear portion 109a on its outer circumferential portion, and meshes with the gear portion 108d of the stepping motor 108 to rotate through a predetermined angle.

The lens holder 101 has projections 101b, as shown in FIG. 10, and the lock ring 109 has lock edges 109b and escape edges 109c. When the lock ring 109 is rotated counterclockwise by the stepping motor 108 through the predetermined angle, i.e., reaches a state shown in FIG. 10, the projections 101b of the lens holder 101 are guided and controlled by the lock edges 109b, and the lens center is locked at a position substantially corresponding with the center of the photographing optical axis. By contrast, when the lock ring 109 is rotated clockwise through the predetermined angle, the projections 101b of the lens holder 101 are separated from the lock edges 109b of the lock ring 109, and stop at positions opposing the escape edges 109c. As a result, the lens holder 101 is released from the control of the lock ring 109, and can move upon being driven by the moving magnet method while being elastically supported by the tensile coil springs 107.

However, in the above prior art, since the tensile coil springs 107 that elastically support the lens holder 101 are simply hooked by a normal method, a relative displacement is produced between the two ends of each spring and the members to which the spring is hooked upon displacement of the lens holder 101, thus causing sliding. The sliding occurs against the frictional force between the springs and members. The correction lens suffers the following adverse influences resulting from the relative displacement and the frictional force produced upon sliding.

1) The lens holder 101 has poor stop position precision and stop position reproducibility in the free state. However, the above prior art poses no problem in the free state, since the central position is determined using the stepping motor 108 and feedback control is made using a position detection means upon blur correction driving.

2) The drive precision of the correction lens deteriorates. Especially, phase delay increases, and the response characteristics to small vibrations are impaired.

SUMMARY OF THE INVENTION

One aspect of the invention is to provide an image blur correction apparatus, including a movable member which moves for image blur correction, an elastic member which movably supports the movable member with respect to a predetermined base member and has one end connected to the movable member and the other end connected to the base member, and a sliding suppression portion for suppressing sliding of the elastic member relative to the base member at a contact surface therebetween, or movement of the elastic member relative to the movable member at a contact surface therebetween. With this arrangement, the stop position control precision of the movable member, the phase delay characteristics and small vibration response characteristics upon operation of the movable member, and the like are improved.

DETAILED DESCRIPTION OF THE PREFERRED EMBODIMENTS

The preferred embodiments of the present invention will be described in detail hereinafter.

Figure 1:
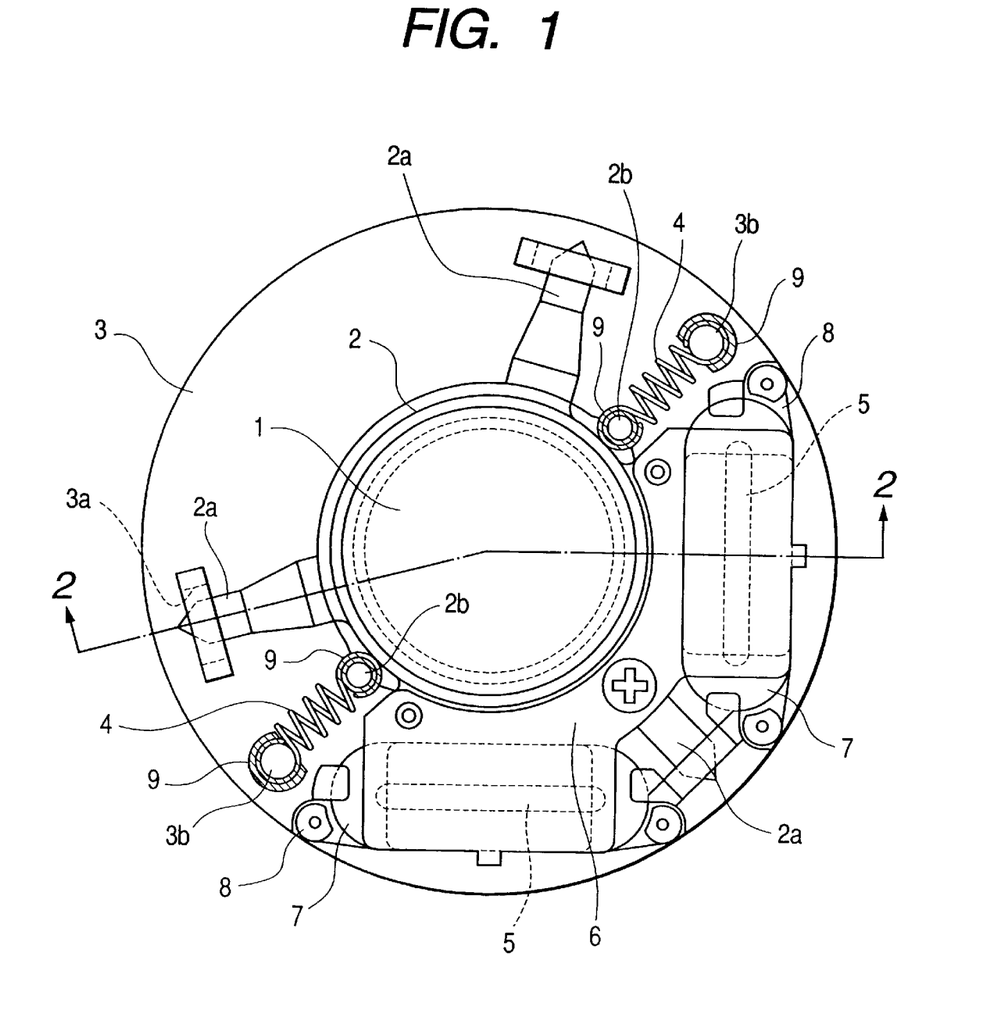
FIG. 1 is a plane view of a blur correction apparatus according to the first embodiment of the present invention.
Figure 2:
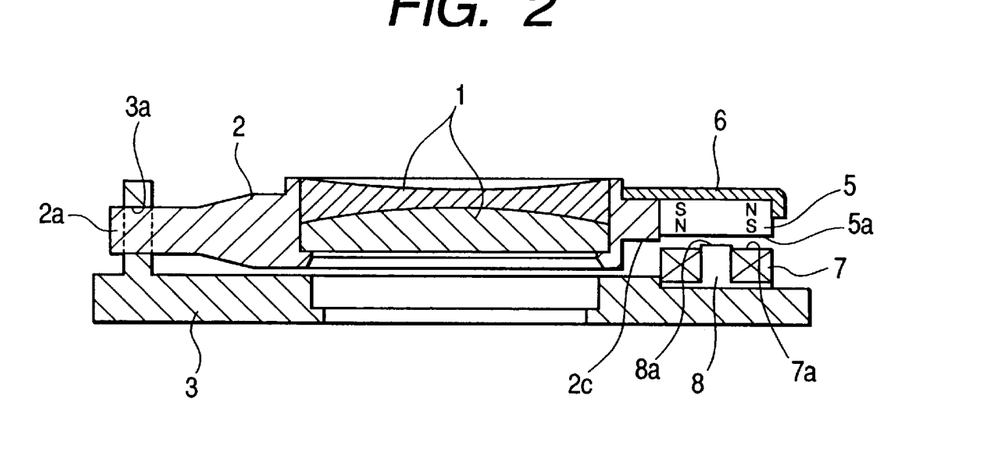
FIG. 2 is a sectional view taken along a line 2—2 in FIG. 1.

FIGS. 1 and 2 show a blur correction apparatus equipped in a camera according to an embodiment of the present invention. FIG. 1 is a plane view of a blur correction apparatus, and FIG. 2 is a sectional view taken along a line 2—2 in FIG. 1.

In these drawings, a correction lens 1 is formed by adhering two lenses, and deflects photographing light when it is displaced in a direction perpendicular to the photographing optical axis. That is, the correction lens 1 is displaced based on a signal supplied from a vibration detection means (not shown) to deflect photographing light in a direction opposite to vibrations, thus correcting any image blur. A lens holder 2 fixes the correction lens 1 therein, and is supported by a base member 3 to be undisplaceable in the optical axis direction but displaceable in a direction perpendicular to the optical axis, since its arm portions 2a are inserted into elongated holes 3a of the base member 3. The lens holder 2 and base member 3 respectively have two spring locks 2b and 3b, and tensile coil springs 4 are hooked therebetween. The two tensile coil springs 4 are prepared to have the same spring characteristic values such as spring constants, numbers of active coils, and the like. Since the two tensile coil springs 4 are set so that the directions of their forces approximately agree with each other, and the lens center is located on the line of action, the lens center is located nearly on the center of the optical axis in a free state.

Permanent magnets 5 are magnetized in the direction of thickness, as shown in FIG. 2. The layout of N and S poles is not limited to the illustrated one, and is determined in association with the energization direction of coils (to be described later). Yokes 6 are fixed by screws to the lens holder 2, and each fix and align one permanent magnet 5 in the horizontal direction and the other permanent magnet 5 in the vertical direction with respect to the correction lens 1. Also, yoke 6 has a function of increasing magnetic flux. Coils 7 are fixed to the base member 3 after each coil of thin copper wire is fixed to a bobbin 8 to form a unit. Upon energizing the coils 7, a correction lens drive mechanism exploiting the so-called moving magnet method is formed, i.e., magnetic poles are generated above and below the coils 7, the permanent magnets 5 receive attraction or repulsion forces, and the lens holder 2 is displaced. An adhesive 9 indicated by hatching in FIG. 1 fixes respective hook portions at the two ends of each tensile coil spring 4 to the spring lock 2b of the lens holder 2 and the spring lock 3b of the base member 3, so that the lens holder 2 and tensile coil spring 4 or the base member 3 and tensile coil spring 4 do not slide relative to each other upon displacement of the lens holder 2.

The operation of the above-mentioned arrangement will be explained below.

When the camera is still in a free state (i.e., a state wherein no electromagnetic forces produced upon energization of the coils 7 act), the lens holder 2 is elastically supported by the tensile coil springs 4, and is located at a position where its lens center nearly corresponds with the center of the photographing optical axis. In FIGS. 8 to 10 that show the prior art, the spring forces of the springs 107 which support the lens are relatively weak, and the lens center is offset from the center of the photographing optical axis depending on the direction of gravity in the free state. When blur correction is disabled, the lock ring 109 is rotated by the stepping motor 108 to determine the central position, and upon blur correction driving, feedback control is done using a position detection means. However, in this embodiment, the spring forces of the tensile coil springs 4 are relatively strong, and any deviation of the lens holder 2 resulting from gravity is very small. Hence, the lens center is located nearly at the center of the photographing optical axis.

Figure 3:
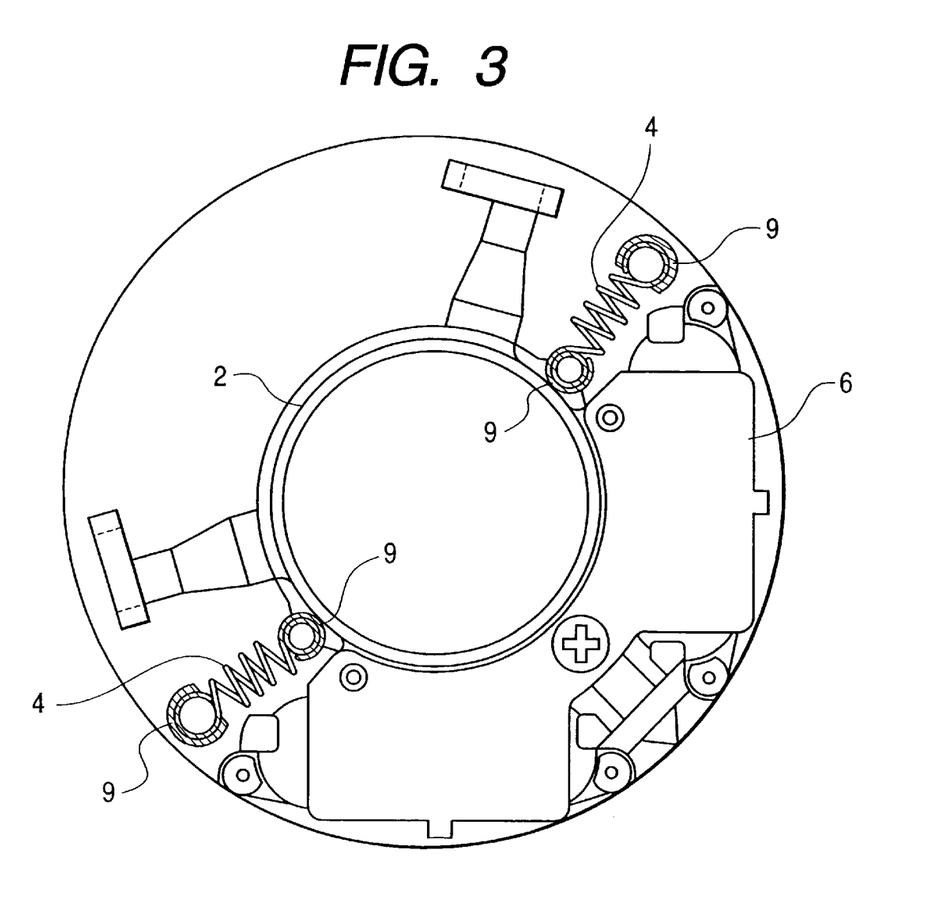
FIG. 3 is a plane view illustrating a state in which a blur correction lens in FIG. 1 is displaced by the maximum distance.

When photographing starts and blur correction is done, vibration detection means (not shown) detect the pitch and yaw vibrations of the camera, and supply currents to the coils 7 to displace the correction lens 1 in a direction to cancel these vibrations. When a current is supplied to the right coil 7 in FIG. 1, the lens holder 2 is displaced to the right or left to correct yaw vibration. When a current is supplied to the lower coil 7 in FIG. 1, the lens holder 2 is displaced upward or downward to correct pitch vibration. For example, when the right coil 7 in FIG. 1 receives a counterclockwise current, the permanent magnet 5 shown in FIG. 2 receives a leftward force, and the lens holder 2 is displaced to the left. In FIG. 2, an upper surface 8a of the central portion of the bobbin 8 is slightly higher than an upper surface 7a of each coil 7, and a lower surface 2c of a magnet receiving portion of the lens holder 2 is slightly lower than a lower surface 5a of each permanent magnet 5, so that the permanent magnet 5 and coil 7 do not directly contact each other. When the lens holder 2 is displaced from the position in FIG. 1 to the rightmost and lowermost position, it reaches the position shown in FIG. 3.

(First Embodiment)

Figure 4:
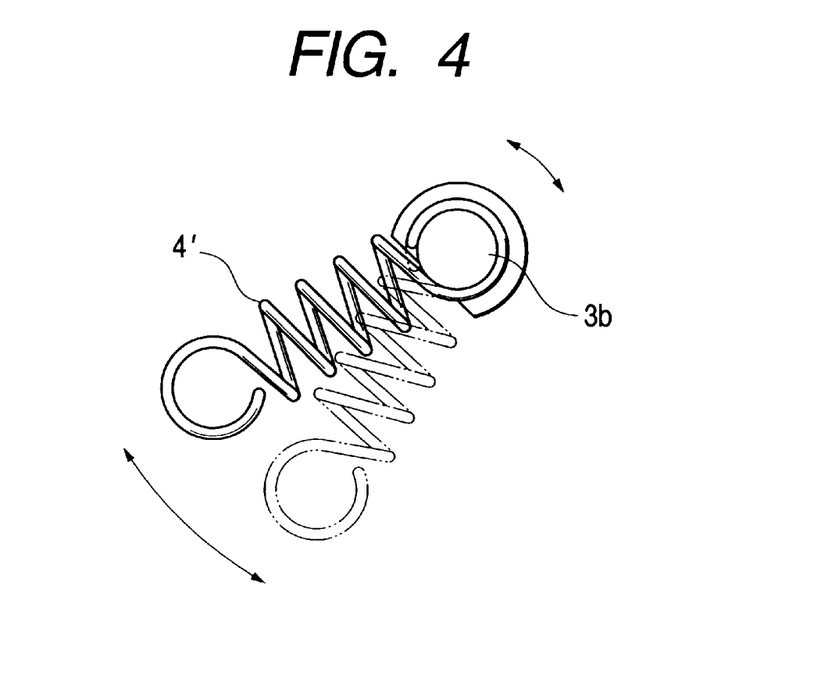
FIG. 4 is a view showing the state wherein a tensile coil spring in the prior art slides with respect to a lock member as a comparative example of the first embodiment of the present invention.
Figure 5:
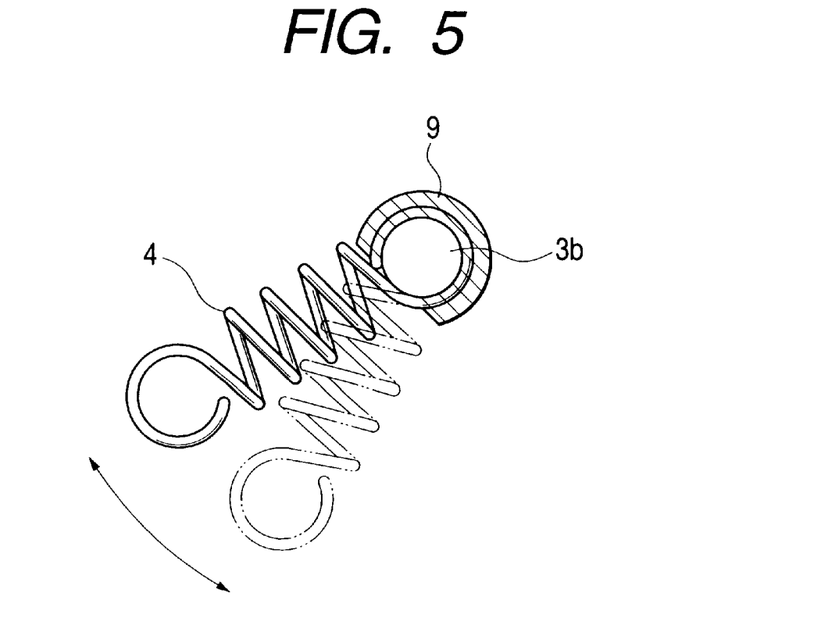
FIG. 5 is a view showing the state wherein the tensile coil spring is adhered and fixed to the lock member in the first embodiment of the present invention.

FIGS. 4 and 5 show the states of the spring lock portion upon displacement of the lens holder 2. FIG. 5 shows the first embodiment of the present invention. In FIG. 5, one hook of the tensile coil spring 4 is adhered and fixed to the spring lock 3b of the base member 3.

In order to clarify the effects and the like of the present invention, FIG. 4 shows as a comparative example a case wherein the spring lock is not fixed, like in the prior art. When the lens holder is displaced, a tensile coil spring 4' is also displaced together with the spring lock of the lens holder. For example, in FIG. 4, the spring 4' is displaced from the solid line state to the broken line state. In this case, since the hook portion of the tensile coil spring 4' is not fixed to the lens holder or base member by an adhesive or the like, the spring 4' rotates while sliding with a member (3b) to be hooked. A frictional force acts between the tensile coil spring 4' and the lock member in a direction opposite to the rotation direction, and serves as resistance against rotation. Also, unless a drive force beyond the frictional force acts, the tensile coil spring 4' neither slides nor rotates at the spring lock. This frictional force poses the following problems.

1) Since the direction of the tensile coil spring in a still state is not stable, the stop position precision and stop position reproducibility of the lens holder deteriorate.

2) Phase delay upon driving the lens holder increases due to the frictional force, and rotation and sliding of the tensile coil spring at the spring lock.

3) Response characteristics to small vibrations are impaired due to the frictional force, and rotation and sliding of the tensile coil spring at the spring lock.

By contrast, in the first embodiment of the present invention shown in FIG. 5, since one hook of the tensile coil spring 4 is adhered and fixed to the spring lock 3b of the base member 3 by the adhesive 9, the tensile coil spring 4 and spring lock 3b do not slide upon displacement of the lens holder 2. Likewise, since the hook on the opposite side is adhered and fixed to the spring lock 2b of the lens holder 2, the spring 4 and spring lock 2b do not slide upon displacement of the lens holder 2.

As described above, when the tensile coil spring 4 and lock member do not slide relative to each other, the direction of the tensile coil spring 4 is made stable, and no frictional force is produced. As a result, the stop position precision and stop position reproducibility can be greatly improved, and phase delay upon driving can be reduced to a negligible level at around 15 Hz or less corresponding to hand vibration. Furthermore, response characteristics to small vibrations can be improved.

As a result of improvement of various characteristics mentioned above, so-called open control can be made, i.e., the lens can be controlled without feeding back any outputs of the position detection means upon blur correction. Hence, position detection means required in the prior art can be omitted, and the stepping motor and lock ring used for determining the central position can also be omitted, thus attaining a great cost reduction and size reduction.

(Second Embodiment)

Figure 6:
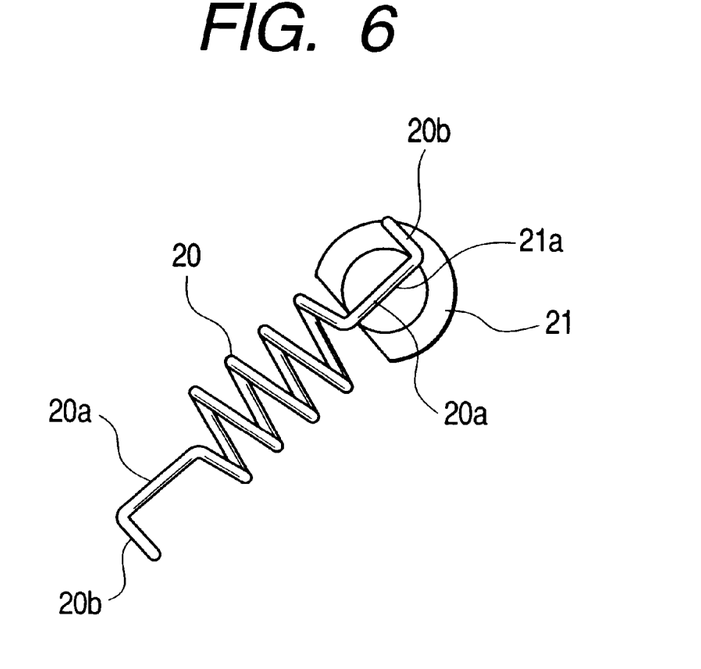
FIG. 6 is a view showing a spring lock of a tensile coil spring according to the second embodiment of the present invention.

FIG. 6 shows a principal part according to the second embodiment of the present invention, i.e., a spring lock of a tensile coil spring.

In FIG. 6, a tensile coil spring 20 has linear portions 20a and hook-shaped portions 20b at two ends, and a groove 21a is formed on a spring lock 21 of a lock member. The linear portion 20a of the tensile coil spring 20 is inserted into the groove 21a upon assembly. The other side (not shown) of the spring is similarly assembled.

In this way, when each hook of the tensile coil spring 20 is formed by a linear portion and hook-shaped portion in place of a circular hook, and is inserted into the groove of the lock member, relative sliding between the spring and lock member can be prevented.

(Third Embodiment)

Figure 7:
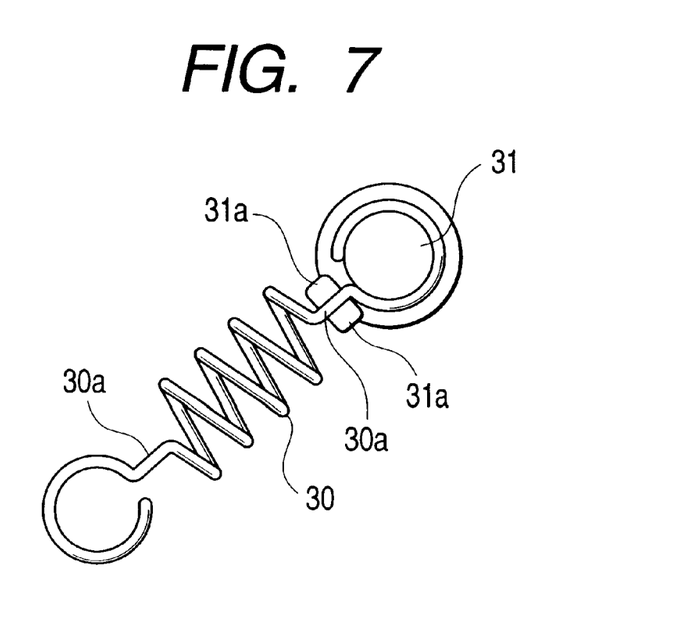
FIG. 7 is a view showing a spring lock of a tensile coil spring according to the third embodiment of the present invention.

FIG. 7 shows a principal part according to the third embodiment of the present invention. A tensile coil spring 30 has a linear portion 30a between a circular hook portion on each end and active spring portion, and a clamping portion 31a is formed on a spring lock 31 of the lock member. Upon assembling the tensile coil spring 30, the linear portion 30a is inserted into the clamping portion 31a.

With this structure, relative sliding between the spring and lock member can be prevented while the spring has circular hook portions.

In FIGS. 6 and 7, the spring can be more reliably fixed by an adhesive.

The tensile coil spring has low cost, high reliability, and high displacement reproducibility.

(Modification)

In each of the above embodiments, tensile coil springs are used as elastic members. However, the present invention is not limited to such specific members. However, the tensile coil spring has low cost, high reliability, and high displacement reproducibility.

The present invention can also be applied to various types of cameras such as a single-lens reflex camera, video camera, electronic still camera, and the like, optical equipment other than cameras, other apparatuses that require blur correction, devices applied to such cameras, optical equipment, or other apparatuses, and elements that construct them.

To restate, according to the embodiments of the present invention, since an elastic member and base member or elastic member and holding member do not slide relative to each other upon blur correction to prevent any frictional force from acting, a correction optical system support device can be provided which can improve the stop position precision and stop position reproducibility in the free state of a correction optical system, improve the phase delay and small vibration response characteristics upon blur correction driving, and attain a size reduction of the blur correction apparatus.

Also, according to the embodiments of the present invention, since the elastic member uses a tensile coil spring which has low cost, high displacement reproducibility, and high reliability, a correction optical system support device can be provided which assures high stop position precision and stop position reproducibility of a correction optical system, and achieves a cost reduction of the correction optical system support device.

Furthermore, according to the embodiments of the present invention, since the end portions of the elastic member are fixed using an adhesive that can assure low-cost, reliable fixing, a correction optical system support device can be provided which can reliably fix the elastic member at low cost.

Moreover, according to the embodiments of the present invention, since the end portions of the elastic member are fixed by inserting each rotation stop portion of the tensile coil spring into a groove of the base member, a correction optical system support device can be provided which can reliably fix the elastic member at low cost and allow easy assembly.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The present invention may also be achieved by combining the above embodiments or their technical elements as needed.

The present invention is effective even when the overall or partial arrangement of the claims or embodiments forms a single apparatus, is coupled to other apparatuses, or becomes an element that builds an apparatus.

The present invention can be applied to various types of cameras such as a single-lens reflex camera, lens-shutter camera, video camera, and the like, optical equipment or other apparatus other than cameras, devices applied to such cameras, optical equipment, or other apparatuses, and elements that construct them.

What is claimed is:

1. An image blur correction apparatus comprising:
    a movable member movable to perform image blur correction;
    an elastic member which movably supports said movable member with respect to a predetermined base member, one end of said elastic member contacting said movable member and the other end of said elastic member contacting said base member; and means for suppressing sliding of said elastic member relative to said movable member at a contact surface between said elastic member and said movable member or sliding of said elastic member relative to said base member at a contact surface between said elastic member and said base member.

2. An image blur correction apparatus according to claim 1, wherein said sliding suppression means fixes an end portion of said elastic member relative to said movable member at the contact surface therebetween.

3. An image blur correction apparatus according to claim 2, wherein said sliding suppression means comprises an adhesive disposed between said elastic member and said movable member.

4. An image blur correction apparatus according to claim 2, wherein said sliding suppression means comprises an element engageable with the end portion of said elastic member, and which suppresses movement of said elastic member relative to said movable member at the contact surface therebetween.

5. An image blur correction apparatus according to claim 1, wherein said sliding suppression means fixes an end portion of said elastic member relative to said base member at the contact surface therebetween.

6. An image blur correction apparatus according to claim 5, wherein said sliding suppression means comprises an adhesive disposed between said elastic member and said base member.

7. An image blur correction apparatus according to claim 5, wherein said sliding suppression means comprises an element engageable with the end portion of said elastic member, and which suppresses movement of said elastic member relative to said base member at the contact surface therebetween.

8. An image blur correction apparatus according to claim 1, wherein said elastic member comprises a spring member.

9. An image blur correction apparatus according to claim 8, wherein said elastic member comprises a tensile spring member.

10. An image blur correction apparatus according to claim 8, wherein said spring member comprises a hook portion, said movable member includes a lock portion engageable with said hook portion, and said sliding suppression means comprises means for preventing said hook portion and said lock portion from sliding relative to each other at a contact surface therebetween.

11. An image blur correction apparatus according to claim 8, wherein said spring member comprises a hook portion, said base member comprises a lock portion engageable with said hook portion, and said sliding suppression means comprises means for preventing said hook portion and said lock portion from sliding relative to each other at a contact surface therebetween.

12. An image blur correction apparatus according to claim 1, wherein said movable member comprises optical means for correcting image blur.

13. An image blur correction apparatus according to claim 1, wherein said movable member is movable in an optical path of the apparatus to perform image blur correction.

14. An apparatus according to claim 1, wherein said movable member is movable by displacement along a predetermined plane to perform image blur correction.

15. An apparatus according to claim 1, further comprising:

drive means for driving movement of said movable member to perform image blur correction.

16. An apparatus according to claim 15, wherein said drive means drives movement of said movable member in accordance with a signal corresponding to vibration.

* * * * *

UNITED STATES PATENT AND TRADEMARK OFFICE
CERTIFICATE OF CORRECTION

PATENT NO. : 6,052,240
DATED : April 18, 2000
INVENTOR(S) : HIDEO IKARI

It is certified that error appears in the above-identified patent and that said Letters Patent is hereby corrected as shown below:

On the Title Page

At [56] References Cited

Attorney, Agent, or Firm

"Fitzpatrick, Cella Harper & Scinto" should read --Fitzpatrick, Cella, Harper & Scinto--.

Column 1

Line 16, "2-15773" should read --2-157732--.
    Line 47, "nearly" should read -near--.

Signed and Sealed this

Seventeenth Day of April, 2001

Attest:

NICHOLAS P. GODICI

*Attesting Officer*    *Acting Director of the United States Patent and Trademark Office*